United States Patent [19]

Bayerlein et al.

[11] Patent Number: 4,645,833

[45] Date of Patent: Feb. 24, 1987

[54] METHOD FOR THE PREPARATION OF BORATE-CONTAINING, DISPERSIBLE, WATER-SOLUBLE POLYGALACTOMANNANS

[75] Inventors: Friedrich Bayerlein; Peter-Paul Habereder, both of Krailling; Nikolaos Keramaris, Eichenau; Nikolaus Kottmair, Gauting; Manfred Kuhn, Munich, all of Fed. Rep. of Germany

[73] Assignee: Sherex Chemical Co., Inc., Dublin, Ohio

[21] Appl. No.: 420,684

[22] Filed: Sep. 21, 1982

[30] Foreign Application Priority Data

Sep. 22, 1981 [DE] Fed. Rep. of Germany ....... 3137537

[51] Int. Cl.$^4$ .................. C08B 37/00; C07H 1/00
[52] U.S. Cl. .................. 536/17.1; 536/18.3; 536/18.5; 536/114; 536/121
[58] Field of Search .............. 536/114, 121, 17.1, 536/18.5, 18.3, 114, 121

[56] References Cited

U.S. PATENT DOCUMENTS

| | | |
|---|---|---|
| 2,644,765 | 7/1953 | Frisch et al. ........................ 536/114 |
| 3,891,621 | 6/1975 | Arthur, Jr. et al. ................. 536/121 |
| 3,912,713 | 10/1975 | Boonstra et al. .................... 536/114 |
| 3,923,781 | 12/1975 | Rogers et al. ....................... 536/121 |
| 4,031,307 | 6/1977 | DeMartino et al. ................. 536/114 |
| 4,172,195 | 10/1979 | Koster et al. ........................ 536/121 |
| 4,214,912 | 7/1980 | Racciato et al. .................... 536/114 |
| 4,269,975 | 5/1981 | Rutenberg et al. ................. 536/114 |
| 4,276,414 | 6/1981 | Tessler ................................ 536/114 |
| 4,292,212 | 9/1981 | Melby . | |
| 4,368,324 | 1/1983 | Bayerlein et al. .................. 536/114 |

Primary Examiner—Johnnie R. Brown

[57] ABSTRACT

Method for preparation of dispersible, water-soluble polygalactomannans and polygalactomannan derivatives by crosslinking with borate ions, in which the polygalactomannan-containing endosperm of legumes is allowed to soak in an aqueous alkaline solution of a material containing borate ions in which the concentration of the borate ions, expressed as borax, is between 0.001 and 0.09 wt % and the hydroxyl ion concentration, expressed as NaOH, is between 0.2 and 10 wt % of the polygalactomannan and after taking up the solution, the cell structure of the splits is mechanically destroyed using high shear forces in a flaking, crushing or extruder process and then the product of the process is dried and ground in known fashion.

6 Claims, No Drawings

METHOD FOR THE PREPARATION OF BORATE-CONTAINING, DISPERSIBLE, WATER-SOLUBLE POLYGALACTOMANNANS

DESCRIPTION

Background Art

The collective terms galactomannans and polygalactomannans include all polysaccharides that are constructed of mannose and galactose building blocks and also have other sugar building blocks to a subordinate extent. Depending on the source, there is a relatively large number of galactomannans. They originate primarily from the endosperm portions of seeds of various legumes, such as guar, carob, tara, *Cassia occidentalis,* flame tree [literal], *Sesbania cannabia, Sesbania aculeata, Sesbania egyptiaca* and honey beans [literal]. Polygalactomannan derivatives that can be produced by the method according to the invention are hydroxyalkyl ethers of polygalactomannans, e.g. hydroxypropyl ethers and hydroxyethyl ethers, carboxyalkyl ethers of polygalactomannans, e.g. carboxymethyl ethers and carboxyethyl ethers, mixed carboxyalkyl- and hydroxyalkyl-substituted polygalactomannans, depolymerized polygalactomannans and quaternary ammonium ethers of polygalactomannans.

Polygalactomannan flour and flours of polygalactomannan derivatives, especially when the individual flour particles are very fine (particle diameters less than 100μ), cause considerable problems when dissolved in water as a result of excessive lumping. These problems have their origin in the fact that upon contact with water, a gel layer forms very rapidly on the surface of the individual particles or aggregates of particles and prevents the water from further penetration and thus leads to the formation of lumps which are difficult and time-consuming to dissolve further.

Various possibilities are currently known for eliminating these problems. For example, it is possible by means of vigorous stirring to prevent lumping of the flour when it is added to water or to reduce or destroy already formed lumps. However, this requires additional, expensive equipment, such as high-powered stirrers or special injection systems.

Another possibility consists of forming a suspension of the flour in a medium that does not have a hydrating effect, e.g. mineral oils or alcohols, and then adding these to the water. However, this requires additional organic solvents whose presence in the prepared galactomannan solution is often undesirable.

It is also known that borate ions can be mixed into the polygalactomannans in the required concentration as a dispersing agent. The minimum concentrations of borate ions, based on borax ($Na_2B_4O_7.10H_2O$), that are necessary to prevent hydration of the flours are dependent on the pH. For example, for 1% guar flour in water at pH 10-10.5, only 0.25-0.5% borax (based on the weight of the guar flour) is required, and at pH 7.5-8, 1.5-2% borax is required (R. Whistler, Industrial Gums (1959)).

The addition of borax to the galactomannans can be performed in various ways. Besides dry mixing of borax to the ground galactomannan, it is also possible to incorporate the borate ions into the flours using an alkaline aqueous/methanolic phase.

It is also possible to incorporate the borax into the galactomannan before grinding the endosperm, e.g. as described in German Patent [Auslegeschrift] No. 23 12 351, according to which, the borax concentration comes to 0.1 to 0.1 to 0.5 wt% of the polygalactomannan.

When macromolecular compounds that have been pretreated in this way are added to water, the borate ions prevent the individual polymer particles from sticking together. The effect of the treatment of macromolecular compounds with borate ions is presumably due to a slight crosslinking that occurs on the surface of the polymer particles and, depending on the type of treatment, is completely or almost completely reversible and which results in a retarded swelling, sinking and distribution of the fine particles of the substance in the water and thus a lump-free solution.

The complex-forming reaction of borate ions with polygalactomannans is reversible, a reduction of the pH value below 7 permits normal swelling of the polymer particles for thickening. A shift of the pH back into the alkaline range can, due to the crosslinking reaction of the borate ions with polygalactomannan compounds, result in a viscosity increase up to the crosslinking.

Although it is naturally desirable to use a minimum amount of borax, according to German Patent [Auslegeschrift] No. 23 12 351, it must be regarded as inadvisable to fall below the limit of 0.1 wt% borax, based on the polygalactomannan, which is given in that patent as the lowest borax concentration (according to the single example, it is 0.2 wt% borax).

SUMMARY OF THE INVENTION

The present invention is based on the problem of producing, by a simple and economical process, polygalactomannans and derivatives of them with the lowest possible content of borate ions so that upon mixing with water or aqueous solvents, no lumps are formed.

A method has now been found for production of borate-containing, dispersible, water-soluble polygalactomannans and polygalactomannan derivatives in which the polygalactomannan-containing endosperm of legumes is allowed to soak in an aqueous, alkaline solution of a material containing borate ions and in which other chemicals which result in the formation of derivatives and/or depolymerizates of these polygalactomannans may be added in known fashion and in which the products of the process are dried and ground in known fashion, which is characterized by the fact that after complete absorption of the solution, the splits are subjected to complete mechanical destruction of the cell structure and that the concentration of the borate ions, expressed as borax ($Na_2B_4O_7.10H_2O$), is between 0.001 and 0.09 wt% of the polygalactomannan and that the concentration of the hydroxyl ions, expressed as sodium hydroxide, is between 0.2 and 10 wt% of the polygalactomannan.

Dispersible polygalactomannan carboxymethylethers can be made by using halogenated acetic acid or one of its salts as the reagent and warming the mixture to approximately 60° to 80° C.

Dispersible polygalactomannan hydroxyalkylethers can be prepared by using a corresponding alkylene oxide, as a reagent, and maintaining the temperature of the mixture between approximately 40° to 70° C. The preferred alkylene oxides are ethylene oxide and propylene oxide.

Dispersible quaternary ammonium ethers of polygalactomannan can be prepared by using a quaternary ammonium compound of the general formula

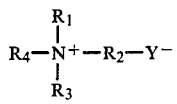

as a reagent, in which $R_1$, $R_2$ and $R_3$ mean the same or different optionally substituted alkyl or aryl groups, and in which $R_4$ means an epoxyalkyl or halohydrin group, and in which Y means an anion, namely, Cl, Br, I or HSO4, and whereby the mixture is maintained at a temperature of 20° to 60° C.

The preferred quaternary ammonium compounds are glycidyl trimethylammonium chloride and 3-chloro-2-hydroxyisopropyl trimethyl ammonium chloride.

Depolymerised polygalactomannans and their derivatives may be obtained in the usual manner by treating with hydrogen peroxide or an alkali peroxide.

BEST AND VARIOUS MODES FOR CARRYING OUT THE INVENTION

Preferred methods for the destruction of the cell structure are flaking, crushing or extrusion processes using high shear forces.

The quantity of solution working on the endosperm can conveniently be 40-130 wt% of the equilibrium weight of the galactomannan. The preferred concentration of the substance containing the borate ions is 0.003 to 0.08 wt% and it is preferably borax. Preferred polygalactomannan-containing endosperms are those of *Cassia occidentalis, Cyamopsis tetragonoloba, Sesbania egyptiaca, Sesbania aculeata, Sesbania cannabia* and *Cerationia siliqua*.

In one embodiment of the method, e.g. with carboxymethylation, or the conversion with substances which lead to the formation of quaternary ammonium ethers of polygalactomannan the chemicals required for the formation of the derivative are added before treatment of the endosperm. In another embodiment, e.g. with alkoxylation, the chemicals required for the derivation are added for reaction with the polygalactomannan only after treatment of the endosperm with the alkaline, borate ion-containing, aqueous solution.

Following the above-mentioned treatment, the endosperm, which is still essentially in its original form, is subjected to a, possibly repeated, cell destruction process. This can be accomplished, e.g., by processing the endosperm between two rollers pressed together and running at different speeds or in a kneader-mixer or an extruder. The material obtained is then dried in a conventional fashion and ground; it is possible, as usual, to reverse the order of the drying and grinding.

The method according to the invention thus differs from the previously known methods in particular by the combination of two essential process steps:

Complete destruction of the cell with simultaneous borate crosslinking. By means of this combination, which yields, according to the invention, a surprisingly thorough and uniform crosslinking reaction, it was possible to keep the concentration of borate ions low in the manner described. In this way, on the one hand, powder that disperses well in water is obtained, and on the other hand, it is possible to avoid a gel formation in an alkaline medium, which affects the washing.

The effect of the treatment can be observed using a simple method for both high- and low-viscosity products. Small amounts of the polygalactomannan are carefully sprinkled on the surface of some water; untreated product floats on the surface, swells up quickly and forms lumps. Product treated according to the invention requires only a minimal stirring of the polymer particles by hand, whereupon it sinks and disperses without lumps in the solution.

The following examples are intended to clarify the invention; the parts given are parts by weight.

EXAMPLE 1

This example describes the effect of an alkaline solution containing borate ions for production of a dispersible guar flour without simultaneous or subsequent derivation. The following materials, with their amounts, are used for production of it:

| | | |
|---|---|---|
| Guar split | 300.00 parts | |
| Sodium hydroxide | 1.50 parts | as a separately prepared |
| Borax | 0.09 parts | solution |
| Water | 300.00 parts | |

The guar splits (shelled and degerminated guar seed) were allowed to soak up the alkaline solution containing borate ions for about ½ hour. Then they were flaked 4 times between two rollers pressed together and running at different speeds, dried and ground to the desired grain size. The viscosity of a 1% solution of the flour, after 2 hours of soaking time, measured on the Brookfield RVT, spindle no. 4, 20 RPM, 20° C., is:

| at pH | Viscosity |
|---|---|
| 5 | 3800 |
| 9.9 | 4400 |
| 11 | 5080 |

EXAMPLE 2

The method of Example 1 was used with the difference that 0.03 parts borox was used. The viscosity of a 1% solution of the flour was:

| at pH | Viscosity |
|---|---|
| 5 | 3800 |
| 10 | 4110 |
| 12 | 4500 |

EXAMPLE 3

This example describes the reaction of alkalized, borate-containing guar splits with propylene oxide to form a hydroxypropyl guar with a degree of substitution of about 0.9.

The following amounts were used:

| | | |
|---|---|---|
| Guar | 300.00 parts | |
| Sodium hydroxide | 9.00 parts | as a separately prepared |
| Borax | 0.09 parts | solution |
| Water | 300.00 parts | |
| Propylene oxide | 99.00 parts | |

The alkaline solution containing borate ions was allowed to work on the galactomannan for about 45 minutes. The mixture was then heated to 60° C. and mixed with propylene oxide. After the end of the reaction, flaking, drying and grinding were performed according to Example 1. The viscosity of a 3% solution in water was 35,500 mPas, measured on the Brookfield RVT, spindle 6, 20 RPM at 20° C.

EXAMPLE 4

This example describes the effect of alkaline water containing borate ions on the endosperm of *Cassia occidentalis* and the subsequent reaction with propylene oxide to form hydroxypropyl *Cassia occidentalis* with a degree of substitution of about 0.3.

Quantities used:

| | | |
|---|---|---|
| *Cassia occidentalis* | 300.00 parts | |
| Water | 300.00 parts | as a separately prepared solution |
| Borax | 0.15 parts | |
| Sodium hydroxide | 4.50 parts | |
| Propylene oxide | 46.00 parts | |

After the alkaline solution containing borate ions was taken up by the polygalactomannan during 45 minutes, the mixture was mixed with the corresponding amount of propylene oxide at 60° C. After the end of the reaction, it was extruded or flaked, dried and ground. The viscosity of a 3% solution of the hydroxypropylated polygalactomannan was 30,000 mPas on the Brookfield RVT, spindle 6, 20 RPM at 20° C.

EXAMPLE 5

This example describes the preparation of dispersible carboxymethyl guar.

25 parts guar endosperm were placed in a kneader-mixer and, with the mixer running, was mixed with a solution of 5.4 parts monochlorosodium acetate and 0.0175 parts borax within about 5 minutes. After 30 minutes of kneading, the mixture was mixed with a solution of 2.7 parts sodium hydroxide in 7 parts water. The reaction mixture was allowed to react at 60° C. (product temperature) for an additional 3 hours with thorough mixing. After the end of the reaction, it was flaked, dried and ground. The carboxymethylated guar flour was soluble in cold water and had the following characteristics:

| | |
|---|---|
| 1. Moisture: | 6-8% |
| 2. Viscosity: | 25,000 mPas (3% solution, Brookfield RVT, spindle 6, 20 RPM at 20° C.) |
| 3. Degree of substitution: | 0.2 (according to the Cu—salt method) |

EXAMPLE 6

This example describes the preparation of dispersible, carboxymethylated *Cassia occidentalis* flour.

50 parts *cessia occidentalis* endosperm was placed in a kneader-mixer and, with the mixer running, was mixed with a solution of 9 parts monochlorosodium acetate and 0.032 parts borax in 40 parts water within about 5 minutes. After 30 minutes of kneading, the mixture was mixed with a solution of 4.5 parts sodium hydroxide in 15 parts water. The reaction mixture was allowed to react at 60° C. (product temperature) for an additional 3 hours with thorough mixing. After the end of the reaction, the still easily pourable splits were extruded, dried and ground. The brownish powder was soluble in cold water and had the following characteristics:

| | |
|---|---|
| 1. Moisture: | 6-8% |

| | |
|---|---|
| 2. Vicosity: | 15,000 mPas (3% solution, Brookfield RVT, spindle 6, 20 RPM at 20° C.) |
| 3. Degree of substitution: | 0.18 (according to the Cu—salt method) |

EXAMPLE 7

The Example describes the preparation of dispersible quaternary ammonium ethers of polygalactomannan from *cassia occidentalis* with a degree of substitution of approximately 0.15 (determined by nitrogen content by the Kjeldahl method.)

The following quantities were used:

| | |
|---|---|
| *Cassia occidentalis* Splits | 350.0 Parts |
| Glycidyltrimethylammoniumchloride | 75.3 Parts |
| Caustic | 8.3 Parts |
| Water | 308.0 Parts |
| Borax | 0.35 Parts |

The water solution of the above mentioned components are allowed to stand in contact with the galactomannan for three hours at 40°-45° C. Subsequently, flocculation, drying and grinding are carried out according to Example 1.

Viscosity of a 3% water solution of the so-prepared flour is 15,000 Pas measured on a Brookfield RVT Spindle No. 6, 20 RPM at 20° C.

EXAMPLE 8

This Example describes the reaction of alkali treated, borate containing guar splits with hydrogen peroxide to a dispersible, depolymerized guar flour.

The following amounts were used:

| | |
|---|---|
| Guar | 200.0 Parts |
| Caustic | 4.0 Parts |
| Borax | 0.2 Parts |
| Water | 200.0 Parts |
| Hydrogen peroxide | 6.0 As 35% Solution |

The water solution of the above mentioned components were contacted with the guar endosperm for 3 hours at approximately 60° C. Subsequently, flocculation, drying and grinding are carried out according to Example 1.

Viscosity of a 3% water solution of the so-prepared meal is 22 m Pas measured on a Brookfield RVT, Spindle Nr 6, 20 RRM at 20° C.

What is claimed is:

1. A process for the preparation of borate-containing, dispersible, water-soluble, polygalactomannan which comprises:
    obtaining polygalactomannan material from endosperm of legumes;
    soaking said polygalactomannan material in an aqueous alkaline solution containing 0.001 to 0.09 weight percent of borate ions, expressed as borax ($Na_2B_4O_7.10H_2O$), based upon the polygalactomannan, and 0.2 to 10 percent weight of hydroxyl ions, expressed as sodium hydroxide, based upon the polygalactomannan to thereby obtain a soaked material;

and then subjecting said soaked material to mechanical treatment resulting in destruction of the cell structure of said polygalactomannan material.

2. The process of claim 1 which comprises employing borax to supply the borate ions.

3. The process of claim 1 wherein said polygalactomannan-containing endosperm is from a material selected from the group of *Cassia occidentalis, Cyamopsis tetragonoloba, Sesbania egyptiaca, Sesbania cannabia, Sesbania aculeata,* or *Ceratonia siliqua.*

4. The process of claim 1 wherein the amount of solution employed is 40% to 130% by weight based upon the equivalent weight of galactomannan present.

5. The process of claim 1 wherein said solution contains 0.003 to 0.08 weight percent of borate ions expressed as borax ($Na_2B_4O_7 \cdot 10H_2O$) based upon the polygalactomannan material.

6. The process of claim 1 wherein said mechanical treatment comprises employing high shear forces by flaking, crushing, or extrusion.

* * * * *